(12) United States Patent
Chauvel et al.

(10) Patent No.: US 6,684,280 B2
(45) Date of Patent: Jan. 27, 2004

(54) TASK BASED PRIORITY ARBITRATION

(75) Inventors: Gerard Chauvel, Antibes (FR); Serge Lasserre, Frejus (FR)

(73) Assignee: Texas Instruments Incorporated, Dallas, TX (US)

( * ) Notice: Subject to any disclaimer, the term of this patent is extended or adjusted under 35 U.S.C. 154(b) by 95 days.

(21) Appl. No.: 09/932,380

(22) Filed: Aug. 17, 2001

(65) Prior Publication Data
US 2002/0083251 A1 Jun. 27, 2002

(30) Foreign Application Priority Data

Aug. 21, 2000 (EP) .......................................... 00402331
Mar. 30, 2001 (EP) .......................................... 01400819

(51) Int. Cl.$^7$ ............................................ G06F 13/00
(52) U.S. Cl. ...................................... 710/244; 709/103
(58) Field of Search ........................ 710/40, 113, 240, 710/244; 709/100, 103

(56) References Cited

U.S. PATENT DOCUMENTS

| | | | |
|---|---|---|---|
| 5,168,566 A | * 12/1992 | Kuki et al. .................. | 709/103 |
| 5,339,443 A | * 8/1994 | Lockwood .................. | 710/244 |
| 5,506,988 A | * 4/1996 | Weber et al. ................ | 709/103 |
| 5,781,862 A | * 7/1998 | Da Silva et al. ............. | 455/436 |
| 5,884,051 A | * 3/1999 | Schaffer et al. ............. | 710/116 |

* cited by examiner

*Primary Examiner*—Glenn A. Auve
(74) *Attorney, Agent, or Firm*—Robert D. Marshall, Jr.; W. James Brady, III; Frederick J. Telecky, Jr.

(57) ABSTRACT

A digital system and method of operation is provided in which several processors (1400, 1402, 1404) are connected to a shared resource (1432). Each processor has an access priority register (1410) that is loaded with an access priority value by software executing on the processor. Arbitration circuitry (1430) is connected to receive a request signal from each processor along with the access priority value from each access priority register. The arbitration circuitry is operable to schedule access to the shared resource according to the access priority values provided by the processors. A software priority state is established during execution of an instruction module on each of the several processors. An instruction is executed on each processor to form an access request to the shared resource. An access priority value is provided with each access request that is responsive to the software priority state of the respective processor. The sequence of instructions is part of a task and the software state is established by defining a task priority for the task and setting the software state in accordance with the task priority. The software priority state is saved during a context switch.

20 Claims, 7 Drawing Sheets

TASK BASED PRIORITY ARBITRATION

This application claims priority to European Application Serial No. 00402331.3, filed Aug. 21, 2000 and to European Application Serial No. 01400819.7 filed Mar. 30, 2001. U.S. patent application Ser. No. 09/932,651 is incorporated herein by reference.

CO-RELATED APPLICATIONS

This application is related to patent application Ser. No. 60/258,190 entitled Access Priority Management, and to patent application Ser. No. 09/932,866 entitled Priority Arbitration Based on Current Task and MMU.

FIELD OF THE INVENTION

This invention generally relates to microprocessors, and more specifically to improvements in access to shared resources, systems, and methods of making.

BACKGROUND

Microprocessors are general purpose processors which provide high instruction throughputs in order to execute software running thereon, and can have a wide range of processing requirements depending on the particular software applications involved.

Many different types of processors are known, of which microprocessors are but one example. For example, Digital Signal Processors (DSPs) are widely used, in particular for specific applications, such as mobile processing applications. DSPs are typically configured to optimize the performance of the applications concerned and to achieve this they employ more specialized execution units and instruction sets. Particularly in applications such as mobile telecommunications, but not exclusively, it is desirable to provide ever increasing DSP performance while keeping power consumption as low as possible.

To further improve performance of a digital system, two or more processors can be interconnected. For example, a DSP may be interconnected with a general purpose processor in a digital system. The DSP performs numeric intensive signal processing algorithms while the general purpose processor manages overall control flow. The two processors communicate and transfer data for signal processing via shared memory. A direct memory access (DMA) controller is often associated with a processor in order to take over the burden of transferring blocks of data from one memory or peripheral resource to another and to thereby improve the performance of the processor.

Modular programming builds a computer program by combining independently executable units of computer code (known as modules), and by tying modules together with additional computer code. Features and functionality that may not be provided by a single module may be added to a computer program by using additional modules.

The design of a computer programming unit known as a task (or function) is often accomplished through modular programming, where a specific task is comprised of one module and the additional computer code needed to complete the task (if any additional code is needed). However, a task may be defined as broadly as a grouping of modules and additional computer codes, or, as narrowly as a single assembly-type stepwise command.

A computer program may be processed (also called "run" or "executed") in a variety of manners. One manner is to process the computer code sequentially, as the computer code appears on a written page or on a computer screen, one command at a time. An alternative manner of processing computer code is called task processing. In task processing, a computer may process computer code one task at a time, or may process multiple tasks simultaneously. In any event, when processing tasks, it is generally beneficial to process tasks in some optimal order.

Unfortunately, different tasks take different amounts of time to process. In addition, the result, output, or end point of one task may be required before a second task may begin (or complete) processing. Furthermore, particularly in a multiple processor environment, several tasks may need access to a common resource that has a generally fixed capacity.

Accordingly, there is needed a system and method for managing task processing that takes into account task processing times, resource capabilities and capacity, and other task processing needs.

SUMMARY OF THE INVENTION

Particular and preferred aspects of the invention are set out in the accompanying independent and dependent claims. In accordance with a first embodiment of the invention, there is provided a digital system having several processors and a shared resource that is accessed by the processors. Each processor has an access priority register that is loaded with an access priority value by software executing on the processor. Arbitration circuitry is connected to receive a request signal from each processor along with the access priority value from each access priority register. The arbitration circuitry is operable to schedule access to the shared resource according to the access priority values provided by the processors.

In another embodiment, a method is provided for prioritizing access to a shared resource in a digital system having several devices vying for access to the shared resource. A software state is established during execution of a sequence of instructions on each of the several devices. An instruction is executed on each device to form an access request to the shared resource. An access priority value is provided with each access request that is responsive to the software state of the respective device. Access to the shared device is scheduled by arbitration using the access priority values.

In another embodiment, the sequence of instructions is part of a task and the software state is established by defining a task priority for the task and setting the software state in accordance with the task priority.

In another embodiment, a first portion of the access priority value is formed in response to the software state, and a second portion of the access priority value is formed in response to a hardware state of the first device. The hardware state is responsive to an interrupt.

In another embodiment, the software state is saved during a context switch.

BRIEF DESCRIPTION OF THE DRAWINGS

Particular embodiments in accordance with the invention will now be described, by way of example only, and with reference to the accompanying drawings in which like reference signs are used to denote like parts and in which the Figures relate to the digital system of FIG. 1 and in which.

Corresponding numerals and symbols in the different figures and tables refer to corresponding parts unless otherwise indicated.

DETAILED DESCRIPTION OF EMBODIMENTS OF THE INVENTION

Although the invention finds particular application to Digital Signal Processors (DSPs), implemented, for example, in an Application Specific Integrated Circuit (ASIC), it also finds application to other forms of processors. An ASIC may contain one or more megacells which each include custom designed functional circuits combined with pre-designed functional circuits provided by a design library.

Figure 1:
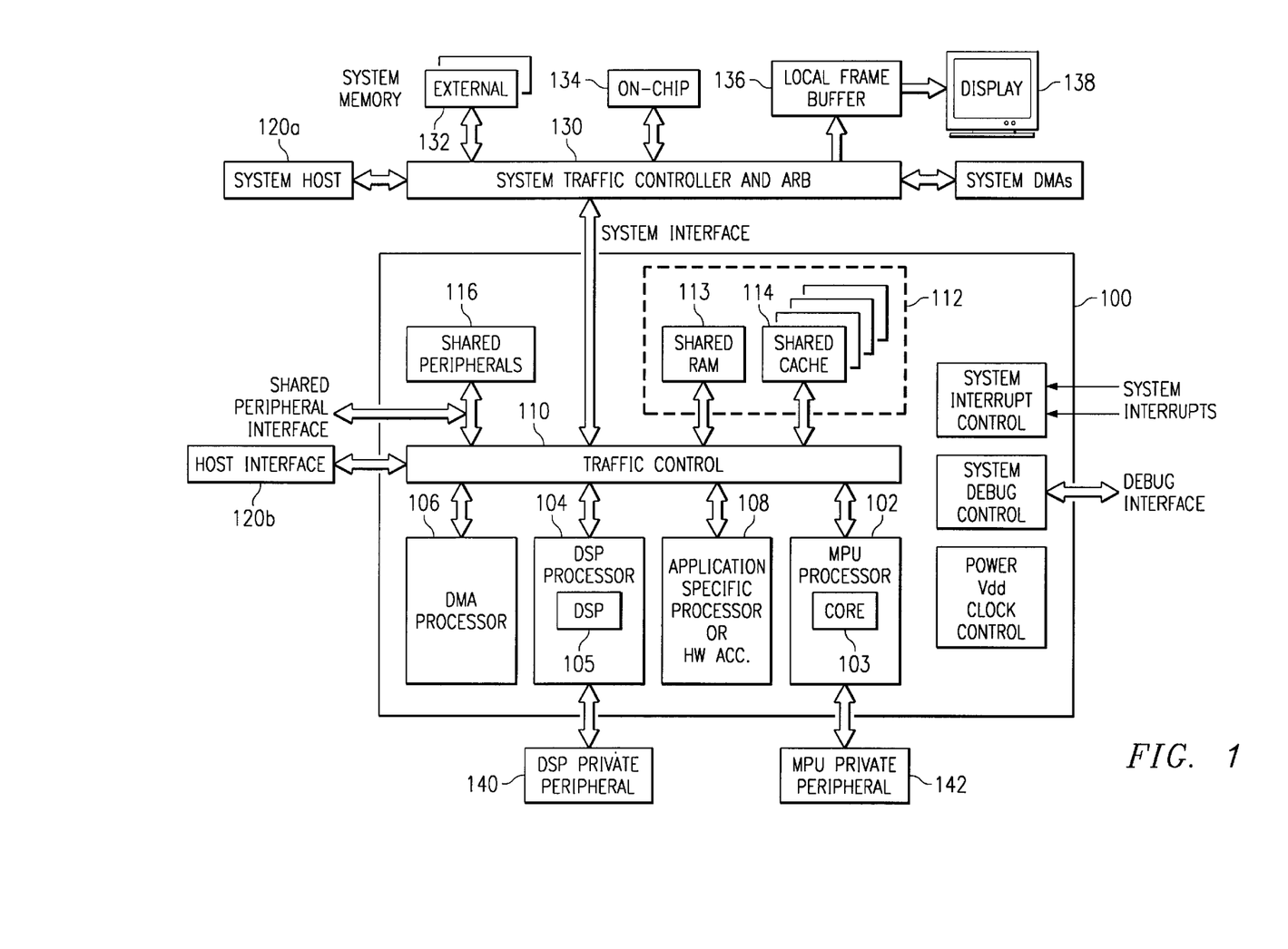
FIG. 1 is a block diagram of a digital system that includes an embodiment of the present invention in a megacell core having multiple processor cores.

FIG. 1 is a block diagram of a digital system that includes an embodiment of the present invention in a megacell core 100 having multiple processor cores. In the interest of clarity, FIG. 1 only shows those portions of megacell 100 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail. U.S. Pat. No. 5,329,471 issued to Gary Swoboda, et al, describes in detail how to test and emulate a DSP. Details of portions of megacell 100 relevant to an embodiment of the present invention are explained in sufficient detail herein below, so as to enable one of ordinary skill in the microprocessor art to make and use the invention.

Referring again to FIG. 1, megacell 100 includes a control processor (MPU) 102 with a 32-bit core 103 and a digital signal processor (DSP) 104 with a DSP core 105 that share a block of memory 113 and a cache 114, that are referred to as a level two (L2) memory subsystem 112. A traffic control block 110 receives transfer requests from a host processor connected to host interface 120b, requests from control processor 102, and transfer requests from a memory access node in DSP 104. The traffic control block interleaves these requests and presents them to the shared memory and cache. Shared peripherals 116 are also accessed via the traffic control block. A direct memory access controller 106 can transfer data between an external source such as off-chip memory 132 or on-chip memory 134 and the shared memory. Various application specific processors or hardware accelerators 108 can also be included within the megacell as required for various applications and interact with the DSP and MPU via the traffic control block.

External to the megacell, a level three (L3) control block 130 is connected to receive memory requests from internal traffic control block 110 in response to explicit requests from the DSP or MPU, or from misses in shared cache 114. Off chip external memory 132 and/or on-chip memory 134 is connected to system traffic controller 130; these are referred to as L3 memory subsystems. A frame buffer 136 and a display device 138 are connected to the system traffic controller to receive data for displaying graphical images. A host processor 120a interacts with the external resources a system traffic controller 130. A host interface connected to traffic controller 130 allows access by host 120a to external memories and other devices connected to traffic controller 130. Thus, a host processor can be connected at level three or at level two in various embodiments. A set of private peripherals 140 are connected to the DSP, while another set of private peripherals 142 are connected to the MPU.

Figure 2A:
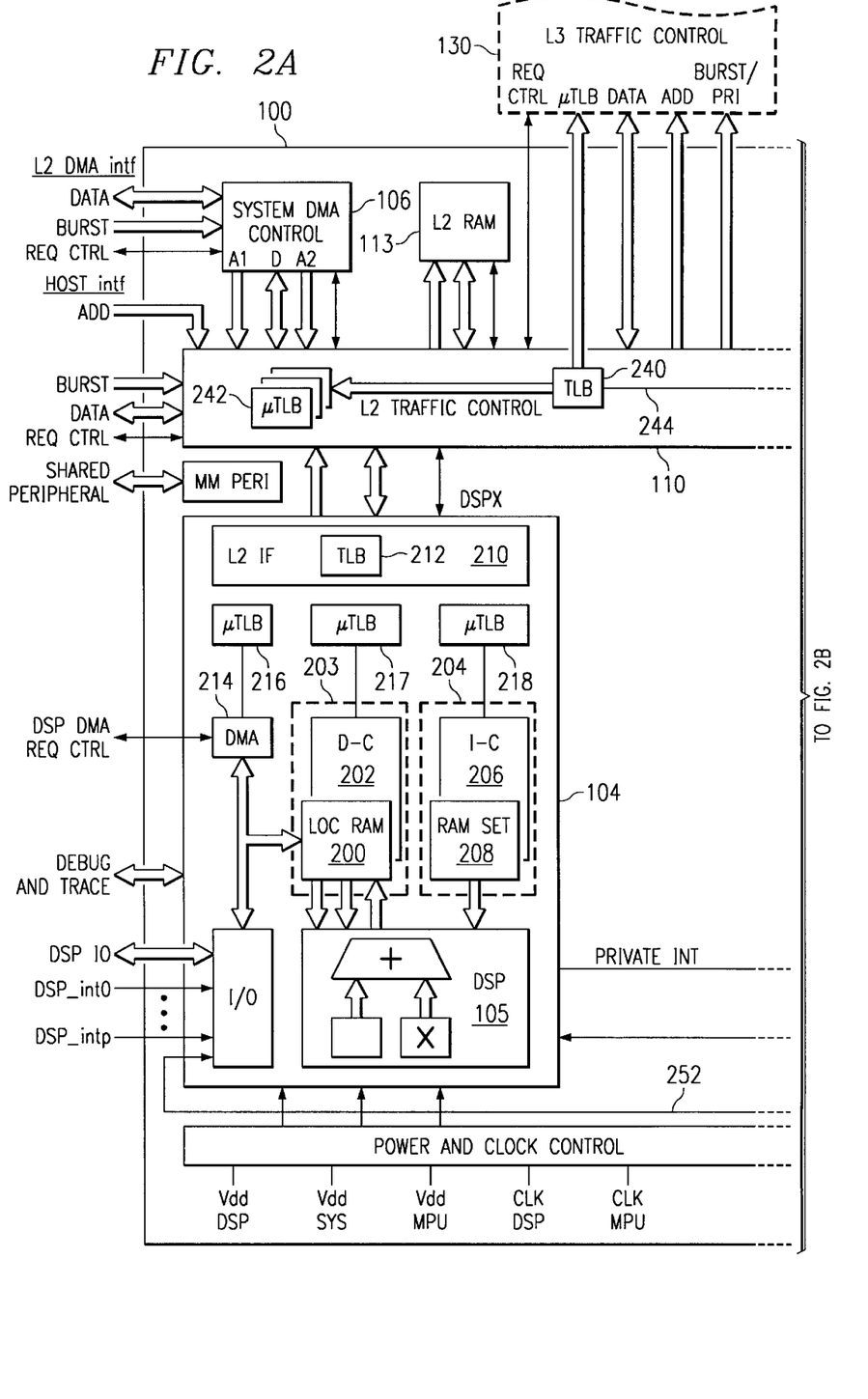
FIGS. 2A and 2B together is a more detailed block diagram of the megacell core of FIG. 1.
Figure 2B:
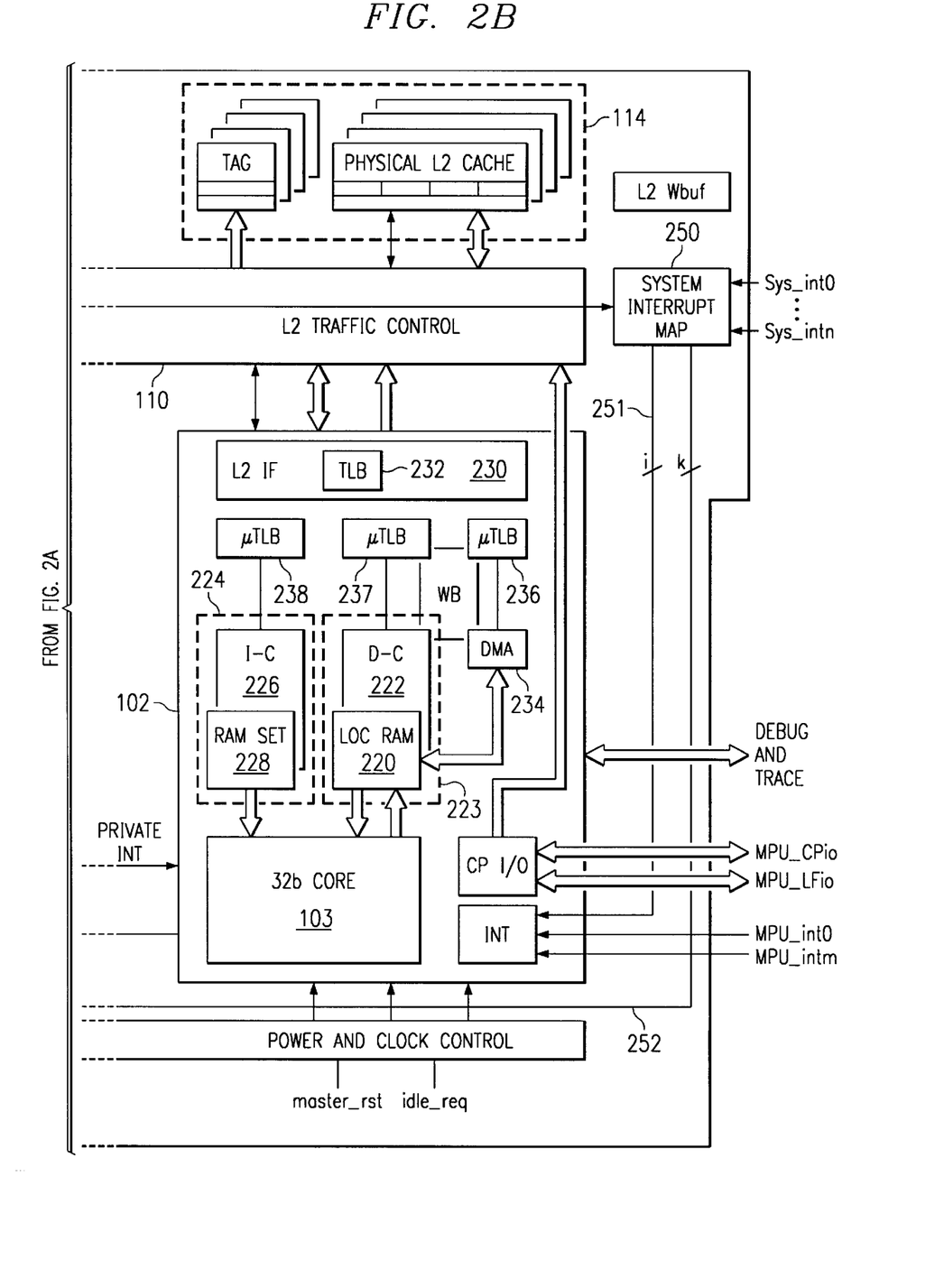

FIG. 2, comprised of FIG. 2A FIG. 2B together, is a more detailed block diagram of the megacell core of FIG. 1. DSP 104 includes a configurable cache 203 that is configured as a local memory 200 and data cache 202, and a configurable cache 204 that is configured as instruction cache 206 and a RAM-set 208, which are referred to as level one (L1) memory subsystems. The DSP is connected to the traffic controller via an L2 interface 210 that also includes a translation look-aside buffer (TLB) 212. A DMA circuit 214 is also included within the DSP. Individual micro TLBs (μTLB) 216–218 are associated with the DMA circuit, data cache and instruction cache, respectively.

Similarly, MPU 102 includes a configurable cache 223 that is configured as a local memory 220 and data cache. 222, and a configurable cache 224 that is configured as instruction cache 226 and a RAM-set 228, again referred to as L1 memory subsystems. The MPU is connected to traffic controller 110 via an L2 interface 230 that also includes a TLB 232. A DMA circuit 234 is also included within the MPU. Individual micro TLBs (μTLB) 236–238 are associated with the DMA circuit, data cache and instruction cache, respectively.

L2 traffic controller 110 includes a TLB 240 and one or more micro-TLB (μTLB) 242 that are associated with system DMA block 106, host processor interface 120b for a host connected at level two, and other application specific hardware accelerator blocks. Similarly, L3 traffic controller 130 includes a μTLB controllably connected to TLB 240 that is associated with system host 120a at level three. This μTLB is likewise controlled by one of the megacell 100 processors.

Memory Management Unit

At the megacell traffic controller level, all addresses are physical. They have been translated from virtual to physical at the processor sub-system level by a memory management unit (MMU) associated with each core, such as DSP core 105 and MPU core 103. At the processor level, access permission, supplied through MMU page descriptors, is also checked, while at the megacell level protection between processors is enforced by others means, which will be described in more detail later.

The translation look-aside buffer (TLB) caches contain entries for virtual-to-physical address translation and access permission checking. If the TLB contains a translated entry for the virtual address, the access control logic determines whether the access is permitted. If access is permitted, the MMU generates the appropriate physical address corresponding to the virtual address. If access is not permitted, the MMU sends an abort signal via signal group 244 to the master CPU 102. The master CPU is identified by the value of the R-ID field. On a slave processor such as a hardware accelerator the R-ID is equal to the R-ID of the master CPU.

Upon a TLB miss, i.e., the TLB does not contain an entry corresponding to the virtual address requested, translation table walk software retrieves the translation and access permission information from a translation table in physical memory. Once retrieved, the page or section descriptor is stored into the TLB at a selected victim location. Victim location selection is done by software or with hardware support using methods known by persons skilled in the art.

Translation Table

To provide maximum flexibility, the MMU is implemented as a software table walk, backed up by TLB caches both at the processor sub-system and megacell level. This allows easy addition of new page size support or new page descriptor information if required. A TLB miss initiates an MMU handler routine to load the missing reference into the TLB. At the Megacell 100 level, a TLB miss asserts a miss signal in signal group 244 and is routed via system interrupt router 250 to the processor having generated the missing reference or to the processor in charge of the global memory management, via interrupt signals 251, 252.

The present embodiment has a distributed operating system (QS) with several domains corresponding to each processor and therefore only a single table manager for all processors. Table update operations are limited to the corresponding R-ID for all slave processors. Access to all could be given to a super OS, such as a communication management OS. The super OS will have right to flush out entries belonging to another processor in a different OS domain. In another embodiment with several independent OSs, for example, there will independent tables. These tables can be located in a memory space only viewed by the OS that they are associated with in order to provide protection from inadvertent modification by another OS.

Translation tables and TLB cache contents must be kept consistent. A flush operation is provided for this reason.

An address reference is generally located within the μTLB or main TLB of each processor sub-system; however, certain references, such as those used by system DMA 106 or host processor 120, for example, to access megacell memories can be distributed within L2 traffic controller 110 and cached into L2 system shared TLB 240. Because system performance is very sensitive to the TLB architecture and size, it is important to implement efficient TLB control commands to flush, lock or unlock an entry when a task is created or deleted without degrading the execution of other tasks. Therefore, each μTLB and L2 cache entry holds a task-ID. During execution, the current task-ID register is compared with the μTLB entry, this also provides better security, as will be described later. During MMU operation, commands are supplied to flush locked or unlocked entries of a μTLB corresponding to a selected task.

The MMU provides cacheability and bufferability attributes for all levels of memory. The MMU also provides a "Shared" bit for each entry to indicate that a page is shared among multiple processors (or tasks). This bit, as standalone or combined with the task-ID, allows specific cache and TLB operation on data shared between processors or/and tasks. The MMU may also provides additional information, such as memory access permission and access priority as described later.

All megacell memory accesses are protected by a TLB. As they all have different requirements in term of access frequencies and memory size, a shared TLB approach has been chosen to reduce the system cost at the megacell level. This shared TLB is programmable by each processor. The architecture provides enough flexibility to let the platform work with either an independent operating system (OS) or a distributed OS with a unified memory management, for example.

The organization of the data structures supporting the memory management descriptor is flexible since each TLB miss is resolved by a software TLB-miss handler. These data structures include the virtual-to-physical address translation and all additional descriptors to manage the memory hierarchy. The list of these descriptors and their function is described in Table 2. Table 1 includes a set of memory access permission attributes. In other embodiments, a processor may have other modes that enable access to memory without permission checks.

TABLE 1

Memory Access Permission

| Supervisor | User |
|---|---|
| No access | No access |
| Read only | No access |
| Read only | Read only |
| Read/Write | No access |
| Read/Write | Read only |
| Read/Write | Read/Write |

TABLE 2

Memory Management Descriptors

| | |
|---|---|
| Execute Never | provides access permission to protect data memory area from being executed. This information can be combined with the access permission described above or kept separate. |
| Shared | indicates that this page may be shared by multiple tasks across multiple processor. |
| Cacheability | Various memory entities such as individual processor's cache and write buffer, and shared cache and write buffer are managed through the MMU descriptor. The options included in the present embodiment are as follows: Inner cacheable, Outer cacheable, Inner Write through/write back, Outer write through/write back, and Outer write allocate. The terms Inner and outer refer to levels of caches that are be built in the system. The boundary between inner and outer is defined in specific embodiment, but inner will always include L1 cache. In a system with 3 levels of caches, the inner correspond to L1 and L2 cache and the outer correspond to L3 due to existing processor systems. In the present embodiment, inner is L1 and outer is L2 cache. |
| Endianism | determines on a page basis the endianness of the transfer. |
| priority | Indicates a priority level for the associated memory address region. Memory access can be prioritized based on this priority value. |

MMU/TLB Control Operation

Figure 3:
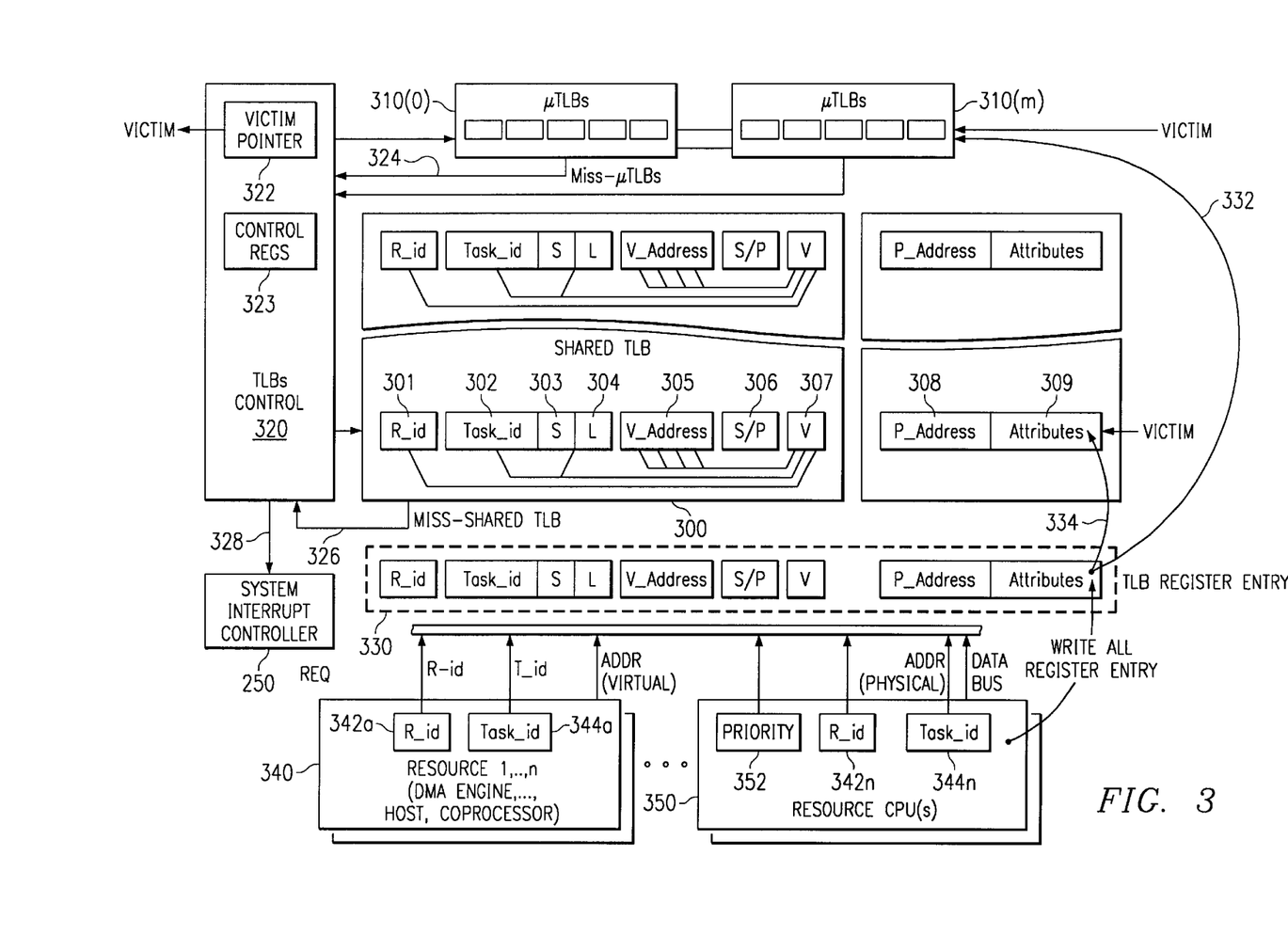
FIG. 3 is a block diagram illustrating a shared translation lookaside buffer (TLB) and several associated micro-TLBs (μTLB) included in the megacell of FIG. 2.

FIG. 3 is a block diagram illustrating a shared translation look-aside buffer (TLB) 300 and several associated micro-TLBs (μTLB) 310(0)–310(n) included in megacell 100 of FIG. 2. On a μTLB miss, the shared TLB is first searched. TLB controller 320 is alerted by asserting a μTLB miss signal 324. In case of a hit on the shared TLB, the μTLB that missed is loaded with the entry content of the shared TLB 300. In case of miss in shared TLB 300, the shared TLB alerts TLB controller 320 by asserting a TLB miss signal 326. Controller 320 then asserts an interrupt request signal 328 to system interrupt controller 250. Interrupt controller 250 asserts an interrupt to the processor whose OS supervises the resource which caused the miss. A TLB entry register 330 associated with TLB controller 320 is loaded by a software TLB handler in response to the interrupt. Once loaded, the contents of TLB entry register 330 are transferred to both shared TLB 300 and the requesting µTLB at a selected victim location as indicated by arcs 332 and 334.

A separate TLB entry register 330 is only one possible implementation and is not necessarily required. The separate register TLB entry register is a memory mapped register that allows buffering of a complete TLB entry (more than 32 bits). A TLB value is not written directly in the TLB cache but is written to the TLB entry register first. Because of the size of an entry, several writes are required to load the TLB entry register. Loading of a TLB cache entry is then done in a single operation "Write TLB entry". Advantageously, others uTLBs associated with other modules can continue access the shared TLB while the TLB entry register is being loaded, until a second miss occurs.

The sequence of operations to update a TLB cache entry after a miss is:
1—control circuitry checks and selects a TLB entry, referred to as a victim TLB cache entry.
2—the software TLB handler writes to the TLB entry register, and
3—the software TLB handler sends a command to write the TLB entry, which transfers a value from TLB entry register to the selected victim TLB cache entry.

The priority on the shared TLB is managed in the same way as priority on a memory access. One or more resources can be using the shared TLB. One or more resources can program the shared TLB. The replacement algorithm for selecting the next victim location in the shared TLB is under hardware control. A victim pointer register 322 is maintained for each TLB and µTLB to provide a victim separate pointer for each. A typical embodiment will use a round robin scheme. Another embodiment may use a least recently used scheme or a random scheme, for example. Different TLBs within a single megacell can use different replacement schemes. However, in an embodiment in which the system has a master CPU with a distributed OS, this master CPU could also bypass the hardware replacement algorithm by selecting a victim entry, reading and then writing directly to the Shared TLB.

In this embodiment, each shared TLB has 256 entries. Each µTLB is generally much smaller, i.e., has fewer entries, than the shared TLB. In various embodiments, each shared TLB has 64–256 or more entries while µTLBs generally have 4–16 entries. The penalty for a miss in a µTLB is small since a correct entry is generally available from the shared TLB. Therefore, the present embodiment does not provide direct control of the victim pointers of the various µTLBs; however, direct control of the victim pointer of shared TLBs, such as 212, 232, and 240, is provided.

Each entry in a TLB has a resource identifier 301 along with task-ID 302. Resource-IDs and task IDs are not extension fields of the virtual address (VA) but simply address qualifiers. A task ID is provided by a task-ID register, such as task-ID register 344 associated with processor 340. Resource IDs are provided by a resource-ID register associated with each resource; such as R-ID register 342 associated with processor 340 and R-ID register 352 associated with resource 350. With the task-ID, all entries in a TLB belonging to a specific task can be identified. They can, for instance, be invalidated altogether through a single operation without affecting the other tasks. Similarly, the resource ID is required because task-ID number on the different processors might not be related; therefore, task related operations must be, in some cases, restricted to a resource-ID. At system initialization, all R-ID and Task-ID registers distributed across the system are set to zero, meaning that the system behaves as if there were no such fields.

In another embodiment, The R-ID and Task-ID registers are not necessarily part of the resource core and can be located in the system, such as a memory mapped register for example, and associated to a resource bus. The only constraint is that a task-ID register must be under the associated OS control and updated during context switch. R-ID must be set during the system initialization.

Referring still to FIG. 3, each TLB entry includes a virtual address field 305 and a corresponding physical address field 308 and address attributes 309. Various address attributes are described in Table 1 and Table 2. Address attributes define conditions or states that apply to an entire section or page of the address space that is represented by a given TLB entry. An S/P field 306 specifies a page size. In the present embodiment, an encoding allows page sizes of 64 kb, 4 kb and 1 kb to be specified. Naturally, the page size determines how many most significant (ms) address bits are included in a check for an entry.

Each TLB entry also includes "shared" bit 303 and a lock bit 304. All entries marked as shared can be flushed in one cycle globally or within a task. A V field 307 indicates if an associated TLB cache entry is valid. V field 307 includes several V-bits that are respectively associated with R-ID field 301 to indicate if a valid R-ID entry is present, task-ID field 302 to indicate if a valid task-ID entry is present, and virtual address field 305 to indicate if a valid address entry is present.

TLB control register set 330 also includes a resource ID and task ID register to check that this address is allowed for a specific resource or for all and for a specific task or for all. When an address is missing from the µTLB, it searches the shared TLB. If a miss occurs in both, an interrupt is returned to the processor in charge.

Still referring to FIG. 3, a memory access priority register 352 is included in each processor 350. The use and operation of priority register 352 will now be described in detail.

Figure 4:
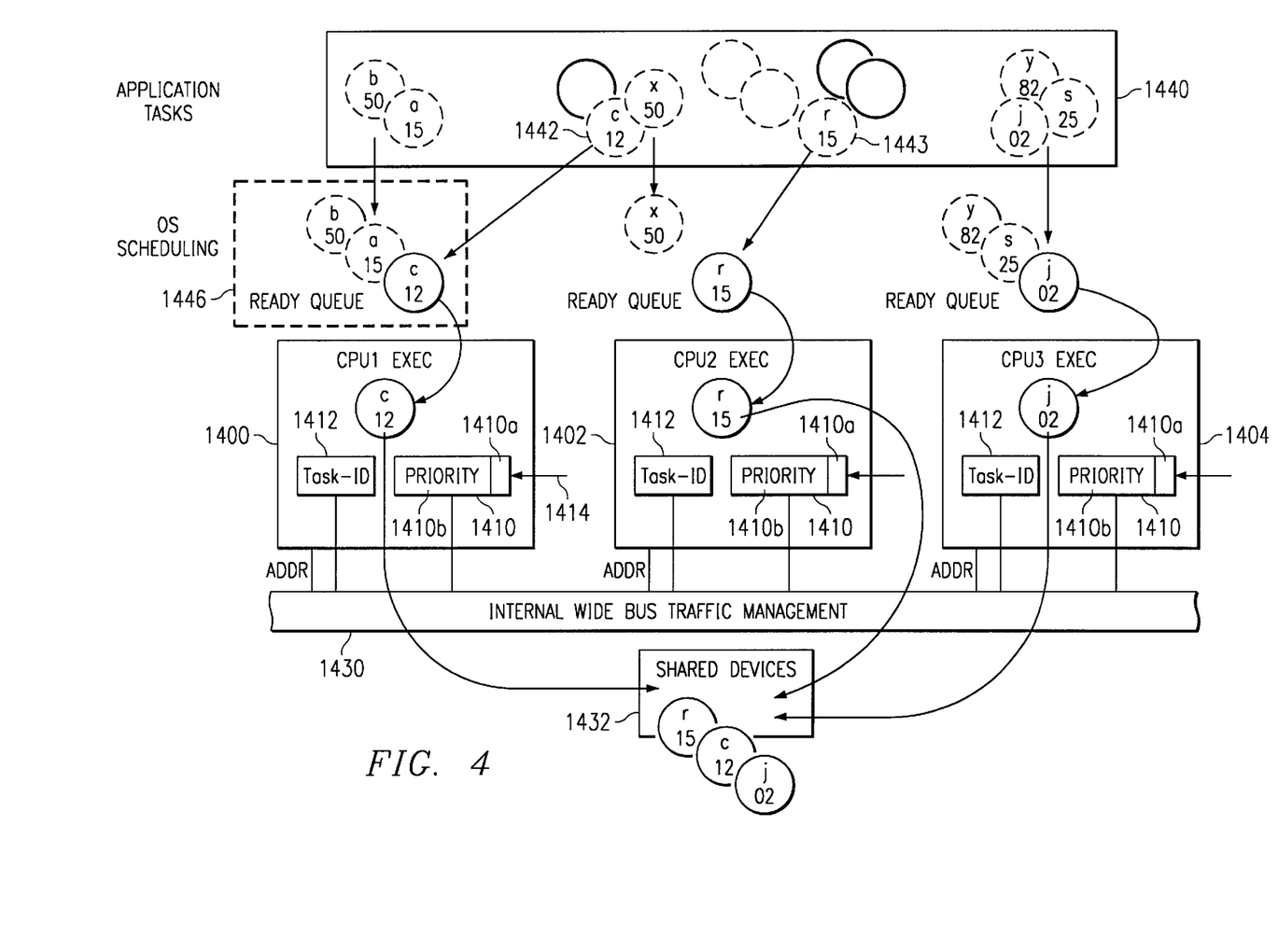
FIG. 4 is a block diagram of a digital system similar to FIG. 1 illustrating a priority register in each processor of a multiprocessor system for task based priority arbitration.

FIG. 4 is a block diagram of a digital system similar to that of FIG. 1 illustrating a priority register 1410 in each processor of a multiprocessor system for task based priority arbitration. Typically, each software task includes a task priority value that is commonly used by an operating system to schedule an order of execution for a set of pending tasks 1440.

In this illustration, a circle such as 1442 represents a task, with a task name "c" and a task priority of 12, for example. Likewise, task 1443 has a task name "r" and a priority of 15, where a lower number indicates a higher priority. If the set of tasks 1440 are assigned to three processors, then an operating system on each processor forms a ready to execute queue, such as ready queue 1446 in which task "c" is scheduled for first execution, then task "a" and finally task "b" according to priority values of 12, 15, and 50 respectively. In a prior system, access to shared resources 1432 would be based on an access priority associated with the processor on which a task is executed. Unfortunately, this scheme may result in slow execution of a high priority task on a low priority processor.

Figure 5:
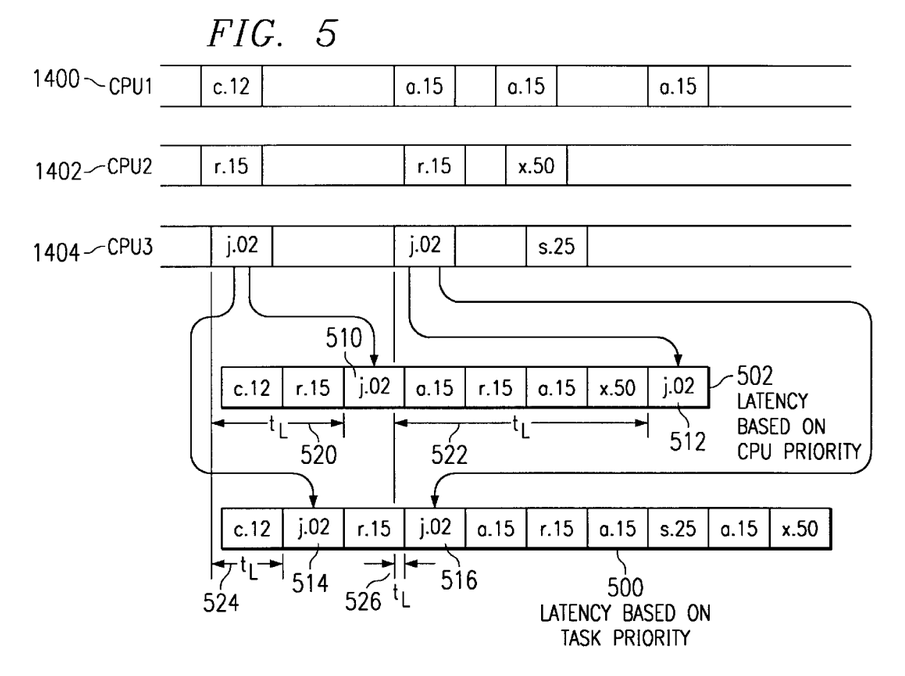
FIG. 5 is a timing diagram illustrating an example of latency using task based priority arbitration according to FIG. 4.

FIG. 5 is a timing diagram illustrating an example of latency using task based memory access priority arbitration according to FIG. 4, as opposed to latency using CPU priority for memory access priority. In this example, CPU1 has a fixed resource priority that is high. CPU1 is executing task c.12, then switches to task a.15. CPU2 is executing task r.15 then switches to low priority task x.50. CPU 3 has a low fixed priority and is executing high priority task j.02 and then switches to lower priority task s.25.

In latency timeline 502 using CPU priority, request c.12 and r.15 occur simultaneously; CPU1 has higher priority than CPU2 and request c.12 is scheduled for shared resource 1432 first. Request j.02 from CPU 3 and r.15 from CPU 2 next via for access. Since CPU2 has higher priority than CPU3, request r.15 is scheduled next and then followed by j.02 at time 510. Then, request a.15 and r.15, followed by request a.15 and x.50 are scheduled before request j.02 is scheduled at time 512.

In latency timeline 500 using task priority, request c.12 and r.15 occur simultaneously; task c.12 has higher priority than r.15 and request c.12 is scheduled for shared resource 1432 first. Request j.02 from CPU 3 and r.15 from CPU 2 next via for access. Since task j.02 has higher priority than task r.15, request j.02 is scheduled next at time 514 followed by request r.15. Then, requests a.15, r.15 and j.02 all occur at approximately the same time. Since task j.02 has the highest priority, request j.02 is next scheduled at time 516. Advantageously, latency time 524 for high priority task j.02 executed on low priority CPU3 using task priority is less than latency time 520 using CPU priority. Similarly, latency time 526 is less than latency time 522.

Referring again to FIG. 4, three processors 1400, 1402, 1404 are illustrated; however, the concept is applicable to only two processors or to four or more. A priority register 1410 and a task-ID register 1412 is provided in processor 1400. Each of the other processors is similarly equipped. A priority field value from priority register 1410 is exported to traffic control logic 1430 that has arbitration circuitry that prioritizes access to a shared resource 1432. Shared resource 1432 can be the L2 cache, for example, or other memory or interface devices, for example.

In another embodiment, only the task-id is exported with the memory access request to the traffic controller and the task-id is used to retrieve the access priority at the system level inside the traffic controller through a look-up table, using content addressable memory, for example.

One bit 1410a of register 1410 is responsive to interrupt signal 1414 such that whenever processor 1400 performs a context switch in response to an interrupt, bit 1410a is set to a value to indicate an interrupt service routine (ISR) is being executed.

In a first embodiment with a simple solution, portion 1410b of register 1410 is only one bit, such that register 1410 is a 1+1 bit register (2-bits). As discussed above, bit 1410a is set by the hardware when an interrupt (or an exception) occurs. In this embodiment, bit 1410a is the msb of register 1410. An application program being executed by processor 1400 can configure portion 1410b, the lsb bit, and will provide one value, such as "0," to the bit if the application must execute with a defined maximum real time limit, referred to as "hard real time" (HRT). On the other hand, an application that does not have a hard time limit or a less critical soft real time limit will provide another value, such as "1," to the bit to indicate "not hard real time" (NHRT) or leave a default low priority provided by the OS. An operating system on processor 1400 can control both bits. Thus, a 2-bit priority state code is formed as described in Table 3. In the case of an interrupt, the contents of priority register 1410 are saved during an ISR context switch.

TABLE 3

| 1+1 Bit Priority States | | | |
|---|---|---|---|
| Type of task | Priority | Set by | code |
| Interrupt service routine | Highest | Interrupt hardware | 00 |
| Kernel OS task | | Kernel software | 01 |
| Hard real time task (HRT) | | Application software | 10 |
| Soft real time task (NHRT) | Lowest | default | 11 |

Since there are two bits, one of the four priority states is used to differentiate an operating system (OS) kernel state from the Interrupt state to manage the shared resource access priority in a finer way. It is important to serve the OS before any application because the OS task scheduler can invert execution priorities. It is also important to differentiate the interrupt state from the kernel state so as not to leave one CPU with highest priority for a long period. Advantageously, an interrupt on a CPU can be served with minimum delay.

If several CPUs access the memory with the interrupt priority state they are served in a round-robin manner using the fixed processor resource priority. In an alternative embodiment, a hierarchical priority or round robin priority can be observed.

Memory access priority can be established in several ways. For example, Table 4 illustrates several portions of instruction code sequences in which a task is spawned and the new task establishes it's priority as it's first operation. In line 1, task "a" is active and spawns a new task, "audio" on line 3. The kernel is then invoked to instantiate the task and a default task priority of NHRT is set at line 8. At line 11, the new task is now active. Among it's first line of code at line 13 is a directive to set the task priority to HRT, making this a high priority task. If the task had done nothing, it would have remained a low priority task by default.

TABLE 4

| Setting Task Priority at the Start of a Task |
|---|
| 1    (Task a : active |
| 2    ---- |
| 3    Taskspawn("audio",200,0,5000,(FUNCPTR)audio, . . . |
| 4         (Kernel) |
| 5    ----- |
| 6         TaskCreateHook( ) |
| 7         { |
| 8         SetTaskAttributePriority(NHRT) /*default value*/ |
| 9         } |
| 10        ---- reschedule |
| 11   (Task Audio : active) |
| 12   { |
| 13   SetTaskAttributePriority(HRT) |
| 14        ------- |
| 15   } |

SetTaskAttributePriority is a system call that initializes the memory access priority (MA-priority) associated with a task, as defined in a task control block. The system call also sets the priority register associated with the task-id register.

Table 5 is an example task control block that is used to define a task. At line 4, an execution priority value is defined that is used by the operating system to schedule execution of the task. At line 9, a memory access priority value is defined that is used to set the task priority register when the task is instantiated. In some embodiment, as described later, these two fields can be combined in a single one corresponding to the OS task priority.

TABLE 5

Setting Task Priority Using a TCB

| | |
|---|---|
| 1 | TCB (task control block) |
| 2 | Typedef struct TCB |
| 3 | { |
| 4 |   UINT OS-priority |
| 5 | |
| 6 | #if CPU_FAMILY == xx |
| 7 | EXC_INFO excinfo; |
| 8 | REG_SET regs; |
| 9 |   UINT MA_priority |
| 10 | #endif |
| 11 | } |

In other embodiments, other means than a TCB may be provided for setting task memory access priority. For example, a call can be made to a subroutine and access priority can be set by either the call or by an operation at the beginning of the subroutine.

In this embodiment, register 1410 is a portion of a status register within the CPU core, such as DSP core 105 and MPU core 103. A call is provided to allow an application program to control only a single bit of the priority register resulting in encoded state '10' or '11', as illustrated at line 13 of Table 3. In another embodiment, register 1410 may be a separate memory mapped register or other type of register that can be controlled by the associated CPU and saved during a context switch and whose outputs can be provided to arbitration circuitry for the shared resource.

In another embodiment, access priority might not be saved on a context switch and the Operating System takes the value held in the MA-priority field of the task control block (TCB) on each rescheduling to program the priority register, for example.

Figure 6:
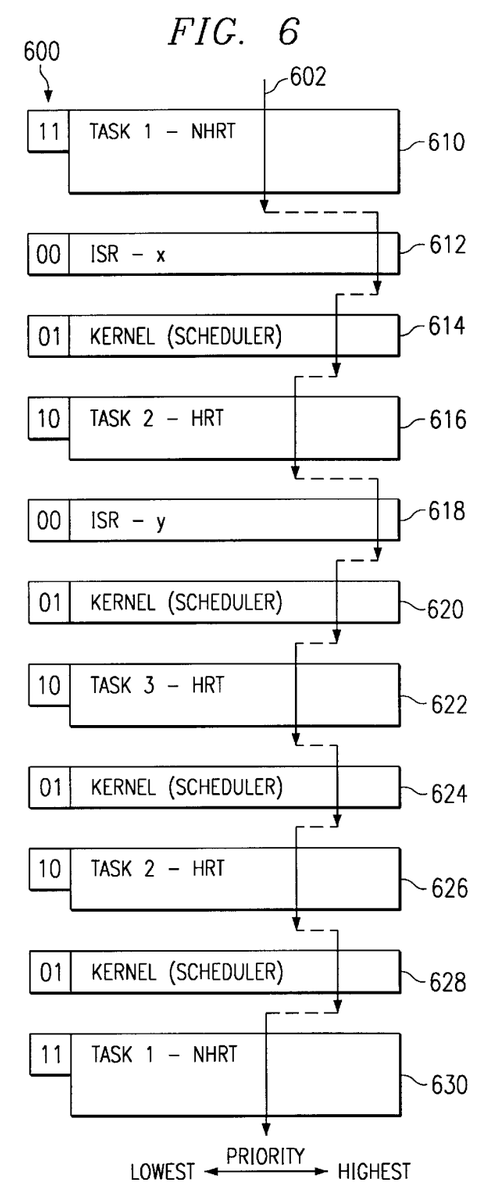
FIG. 6 is a state diagram illustrating execution of several different tasks using task based priority arbitration according to FIG. 4.

FIG. 6 is a state diagram illustrating execution of several different tasks using task based priority arbitration according to FIG. 4. Access priority value 600 is representative of the output of priority register 1410. Priority level indicator 602 represents the access priority level responsive to a given software priority state, where priority increases to the right.

In software execution state 610, a task 1 is executing with a low access priority, NHRT.

In software execution state 612, an interrupt occurs and execution is transferred to interrupt service routine x (ISR). The access priority "11" associated with software execution state 610 is saved during the resulting context switch and access priority "00" is set by CPU hardware in response to the interrupt. Thus, a hardware state is entered in response to the interrupt and the access priority register is modified in response to this hardware state.

In software execution state 614, ISR x initiates execution of the OS Kernel scheduler by performing a system call. OS software sets the access priority to "01" by writing to priority register 1410. During this execution state, the kernel schedules task 2 for execution.

In software execution state 616, task 2 is activated as part of ISR x and has a hard real time limit. The OS sets the access priority to "11" by writing to the priority register, but the first operation of an HRT task is to set the access priority to "10" by sending a command to set the LSB of the priority register to "0". As mentioned above, an application program cannot change the MSB of the priority register.

In software execution state 618 a second interrupt y is taken, since the interrupt priority of interrupt y is greater than the interrupt priority of interrupt x. Again, the access priority of task 2 is saved during the resulting context switch and the access priority is forced to "00" by CPU hardware.

In software execution state 620, ISR y calls the OS and the scheduler in invoked. The OS sets the access priority to "01" and during this execution state schedules task 3 for execution.

In software execution state 622, task 3 is activated as part of ISR y and has a hard real time limit. The OS again sets the access priority to "11," which is the default lowest NHRT priority, but the first operation of an HRT task is to set the access priority to "10" by sending a command to set the LSB of the priority register to "0".

In software execution state 624, task 3 performs a "return" to complete ISR y and the scheduler is again invoked.

In software execution state 626, a context switch restores task 2 and its access priority value of "10".

In software execution state 628, task 2 performs a "return" to complete ISR x and the scheduler is again invoked.

In software execution state 630, a context switch restores task 1 and its NHRT access priority value of "11".

Of course, this illustration is merely illustrative of the types of sequences that can occur during program execution.

In summary, a variable access priority is provided. The OS kernel can vary the access priority by writing to the priority register. A hardware state, such as in response to an interrupt, can change the access priority. Various program modules of an application program can change the access priority in a limited range.

In an alternative embodiment, priority register portion 1410b is n bits, where n is generally 8-bits for a Real Time Operating System (RTOS), for example. One bit 1410a of register 1410 is responsive to interrupt signal 1414 such that whenever 1400 performs a context switch in response to an interrupt, bit 1410a is set to a value to indicate an interrupt service routine (ISR) is being executed. Bit 1410a is treated as a most significant bit of priority register 1410, thus 1+n bits are provided for the access priority field register 1410. In this embodiment, a task priority corresponding to the OS-priority field in line 4 of Table 4 associated with each task is loaded in priority register portion 1410b as each task begins execution. In this case, the same value that is used for OS scheduling, such as the value at line 3 of Table 5, can be used for memory access scheduling. Alternatively, a different memory access value of n bits can be specified by defining a value, such as at line 9 of Table 5. Advantageously, in this embodiment there is no need for an extra access priority register; the OS execution priority register is used for both functions.

In either embodiment, the 2 bits or n+1 bits are used to control the priority of accesses to shared resources 1432. In addition, each CPU resource is also assigned a priority. If two resource make a requests with identical task priority to a shared resource, then access to the shared resource is provided in a round robin manner so that the higher priority resource doesn't starve the lower priority resource. Other embodiments may use other mechanism than round robin, such as a random or a fixed order of selection, for example.

Figure 7:
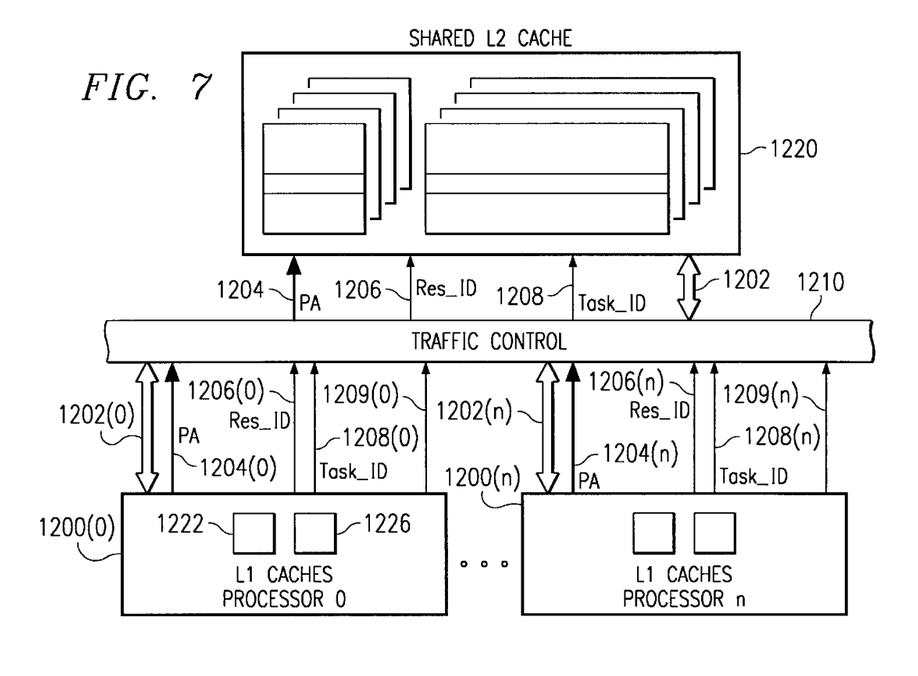
FIG. 7 is a more detailed block diagram illustrating various inter-connections between processors and a shared resource using task based priority arbitration according to FIG. 4.

FIG. 7 is a more detailed block diagram illustrating various inter-connections between processors and a shared resource using task based priority arbitration according to FIG. 4. A data bus 1202(n), physical address bus 1204(n), resource ID signals 1206(n), task ID signals 1208(n) and priority signals 1209(n) are provided by each processor 1200(n) for each L2 request. Recall from earlier description that TLBs associated with each requester provides the physical address signals for each request. The task based priority value provided by a register within the processor is provided on priority signals 1209(n). Traffic controller 1210 examines the priority signals provided by each processor and sends the highest priority request to L2 cache 1220 using data bus 1202, physical address bus 1204, resource ID signals 1206, and task ID signals 1208 to completely identify each request. In the present embodiment, TLBs are used to convert virtual addresses to physical addresses.

Digital System Embodiment

Figure 8:
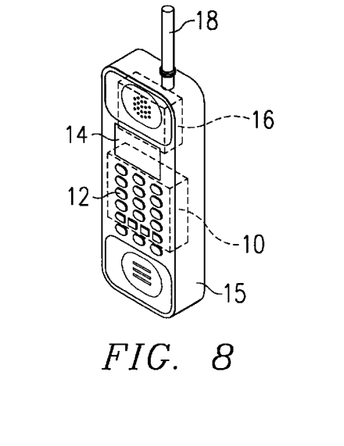
FIG. 8 is a representation of a telecommunications device incorporating an embodiment of the present invention.

FIG. 8 illustrates an exemplary implementation of an example of such an integrated circuit in a mobile telecommunications device, such as a mobile telephone with integrated keyboard 12 and display 14. As shown in FIG. 8, the digital system 10 with a megacell according to FIG. 2 is connected to the keyboard 12, where appropriate via a keyboard adapter (not shown), to the display 14, where appropriate via a display adapter (not shown) and to radio frequency (RF) circuitry 16. The RF circuitry 16 is connected to an aerial 18.

It is contemplated, of course, that many other types of communications systems and computer systems may also benefit from the present invention, particularly those relying on battery power. Examples of such other computer systems include personal digital assistants (PDAs) portable computers, smart phones, web phones, and the like. As power dissipation is also of concern in desktop and line-powered computer systems and micro-controller application, particularly from a reliability standpoint, it is also contemplated that the present invention may also provide benefits to such line-powered systems.

Fabrication of the digital systems disclosed herein involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

The digital systems disclosed herein contain hardware extensions for advanced debugging features. These assist in the development of an application system. Since these capabilities are part of the megacell itself, they are available utilizing only a JTAG interface with extended operating mode extensions. They provide simple, inexpensive, and speed independent access to the core for sophisticated debugging and economical system development, without requiring the costly cabling and access to processor pins required by traditional emulator systems or intruding on system resources.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

As used herein, the term "higher priority" and "lower priority" refers to a logical value and not necessarily to a numeric value. For example, higher priority can be accorded to a lower numeric value.

A shared resource is typically a memory of a cache. However, other resources may be shared and make use of access scheduling using priority values as described herein. For example, memory mapped input/output (I/O) devices and ports, shared TLBs as described with respect to FIG. 3, graphical or video frame buffers, etc.

While the invention has been described with reference to illustrative embodiments, this description is not intended to be construed in a limiting sense. Various other embodiments of the invention will be apparent to persons skilled in the art upon reference to this description. For example, in another embodiment, one or more devices provide both an address space priority value and a task priority value, while in the same system other devices provide one, but not both variable priority values. In this case, arbitration circuitry still schedules access to a shared resource according to the higher priority of either a pair of priority values or a single priority value.

In another embodiment, one or more devices which access a shared resource do not provide variable priority values as described above. In this case, access for that device is scheduled according to a fixed or positional priority, such as a resource, number using a fixed hierarchical scheme or a round robin scheme, for example.

It is therefore contemplated that the appended claims will cover any such modifications of the embodiments as fall within the true scope and spirit of the invention.

What is claimed is:

1. A method for prioritizing access to a shared resource in a digital system having a plurality of devices vying for access to the shared resource, comprising the steps of:

establishing a software priority state associated with a program module;

executing an instruction from the program module on a first of the plurality of devices to form an access request to the shared resource;

providing an access priority value with the access request that is responsive to the software priority state of the program module; and arbitrating for access to the shared resource by using the access priority value.

2. The method of claim 1, in which the program module is a task and wherein the step of establishing a software priority state comprises the steps of defining a task priority for the task and setting the software priority state in accordance with the task priority.

3. The method of claim 2, wherein the task priority is defined by a task control block.

4. The method according to claim 1, wherein the step of establishing a software priority state comprises loading a register with an access priority value responsive to the software priority state each time execution of the program module begins.

5. The method according to claim 4, wherein the step of providing an access priority value comprises the steps of:

forming a first portion of the access priority value in response to the software priority state; and forming a second portion of the access priority value in response to a hardware state of the first device.

6. The method of claim 5, wherein the first portion of the access priority value is represented by a first bit in a first register of the first device, and the second portion is represented by a second bit in the first register.

7. The method of claim 5, wherein the first portion of the access priority value is represented by a plurality of bits in a first register of the first device, and the second portion is represented by a single bit in the first register.

8. The method according to claims 5, wherein the hardware state is responsive to an interrupt received by the first device.

9. The method according to claim 5, wherein the first portion and the second portion of the access priority value is set by operating system software associated with the first device.

10. The method according to claim 5, wherein only the first portion of the access priority can be controlled by application software executed on the first device.

11. The method according to claim 5, further comprising the step of saving the priority state during a context switch.

12. A digital system comprising:

a shared resource;

a plurality of devices connected to access the shared resource, wherein each device is operable to execute a respective software module and has an access priority register and a request output;

arbitration circuitry connected to receive a request signal from each request output along with an access priority value from each access priority register, wherein the arbitration circuitry is operable to allow access to the shared resource according to the access priority value; and wherein the access priority register of each device is loaded with an access priority value by the respective software module executing on the respective device.

13. The digital system of claim 12, wherein a portion of the access priority register is set in response to an interrupt received by the respective device.

14. The digital system of claim 13, wherein only a portion of the access priority register can be modified by application software being executed on the respective device.

15. The digital system of claim 14, wherein each device further comprising a task ID register operable to be loaded with a task ID value responsive to a task being executed by the respective device; and wherein the priority register is connected to receive the task ID value and is operable to perform a table lookup in response to the task ID value.

16. The digital system of claim 12 being a cellular telephone, wherein one of the plurality of devices is a CPU, further comprising:

an integrated keyboard connected to the CPU via a keyboard adapter;

a display, connected to the CPU via a display adapter;

radio frequency (RF) circuitry connected to the CPU; and an aerial connected to the RF circuitry.

17. A method for prioritizing access to a shared resource in a digital system having a plurality of devices vying for access to the shared resource, comprising the steps of:

establishing a respective software priority state associated with a respective program module on each of the plurality of devices;

executing an instruction from each of the respective program modules on the plurality of devices to form a plurality of access requests to the shared resource;

providing a respective access priority value with each of the plurality of access requests that is responsive to the respective software priority state of the respective program module; and arbitrating for access to the shared resource by using the respective access priority values provided with the plurality of access requests.

18. The method of claim 17, in which the program module is a task and wherein the step of establishing a software priority state comprises the steps of defining a task priority for the task and setting the software priority state in accordance with the task priority.

19. The method of claim 18, wherein the task priority is defined by a task control block.

20. The method according to claim 17, wherein the step of establishing a software priority state comprises loading a register with an access priority value responsive to the software priority state each time execution of the program module begins.

* * * * *